US012669521B2

(12) United States Patent
Oosterbroek et al.

(10) Patent No.: US 12,669,521 B2
(45) Date of Patent: Jun. 30, 2026

(54) DISTRIBUTION SYSTEM AND METHOD FOR DISTRIBUTING CARRIERS

(71) Applicant: Roche Diagnostics Operations, Inc., Indianapolis, IN (US)

(72) Inventors: Edwin Oosterbroek, Cham (CH); Nicolas Seungoon Sillitoe, Allenwinden (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 512 days.

(21) Appl. No.: 17/931,944

(22) Filed: Sep. 14, 2022

(65) Prior Publication Data

US 2023/0100112 A1 Mar. 30, 2023

(30) Foreign Application Priority Data

Sep. 28, 2021 (EP) ..................................... 21199467

(51) Int. Cl.
*G01N 35/10* (2006.01)
*G01C 21/34* (2006.01)
(Continued)

(52) U.S. Cl.
CPC ......... *G01N 35/10* (2013.01); *G01C 21/3415* (2013.01); *G01C 21/3492* (2013.01); *G01C 21/3605* (2013.01); *G01N 35/00584* (2013.01)

(58) Field of Classification Search
CPC ............. G01N 35/10; G01N 35/00584; G01N 35/1081; G01N 35/109; B65G 1/137; G01C 21/3415; G01C 21/3492; G01C 21/3605
See application file for complete search history.

(56) References Cited

U.S. PATENT DOCUMENTS 7,591,630 B2 * 9/2009 Lert, Jr. ............... B65G 1/0492
414/280
7,991,505 B2 * 8/2011 Lert, Jr. ............... B65G 1/0492
700/214
(Continued)

FOREIGN PATENT DOCUMENTS

CA 3054847 3/2020
CN 108339591 7/2018
(Continued)

OTHER PUBLICATIONS

European Search Report issued Feb. 15, 2022, in Application No. 21199467.8, 4 pp.
(Continued)

*Primary Examiner* — Gertrude Arthur Jeanglaude
(74) *Attorney, Agent, or Firm* — Woodard, Emhardt, Henry, Reeves & Wagner, LLP

(57) ABSTRACT

A distribution system is disclosed. The distribution system comprises a transport plane comprising logical positions, carriers for transporting objects, a drive system to move the carriers on the transport plane between logical positions, a control system configured for controlling the carriers to move on a planned route from a start position to a final destination position on the transport plane via logical positions, wherein the control system comprises a routing system configured for calculating routes for at least two carriers on the transport plane by modeling the transport plane with graphs of nodes, wherein the routing system is configured for calculating the planned routes considering balancing of surface usage of the transport plane, and wherein the routing system is configured for considering temporal blocking of logical positions and/or a considering variable move length and/or considering a variable reservation length.

33 Claims, 5 Drawing Sheets

(51) Int. Cl.
    *G01C 21/36*       (2006.01)
    *G01N 35/00*      (2006.01)

(56)          References Cited

U.S. PATENT DOCUMENTS

| | | | |
|---|---|---|---|
| 9,147,173 B2 * | 9/2015 | Jones | G05D 1/0234 |
| 2009/0055232 A1 * | 2/2009 | Bruno | G06Q 10/08 |
| | | | 700/229 |
| 2015/0355207 A1 * | 12/2015 | Pollack | G01N 35/04 |
| | | | 422/65 |
| 2015/0360878 A1 | 12/2015 | Denninger et al. | |
| 2016/0341751 A1 | 11/2016 | Huber et al. | |
| 2017/0101277 A1 | 4/2017 | Malinowski | |
| 2017/0168079 A1 | 6/2017 | Sinz | |
| 2017/0184622 A1 | 6/2017 | Sinz et al. | |
| 2018/0348244 A1 | 12/2018 | Ren | |
| 2019/0086433 A1 | 3/2019 | Hermann et al. | |
| 2020/0400698 A1 | 12/2020 | Hafner et al. | |
| 2023/0146784 A1 * | 5/2023 | Use | G01N 35/0099 |
| | | | 422/65 |

FOREIGN PATENT DOCUMENTS

| | | |
|---|---|---|
| EP | 2589966 | 5/2013 |
| EP | 2566787 B1 | 3/2016 |
| EP | 3095739 A1 | 11/2016 |
| EP | 3251986 A1 | 12/2017 |
| EP | 3537159 A1 | 9/2019 |
| JP | 2020201167 | 12/2020 |
| WO | 2012/158520 A1 | 11/2012 |
| WO | 2012/158541 A1 | 11/2012 |
| WO | 2013/098202 A1 | 7/2013 |

OTHER PUBLICATIONS

Silver, David, Cooperative Pathfinding, American Association for Artificial Intelligence, 2005, pp. 117-122.

* cited by examiner

DISTRIBUTION SYSTEM AND METHOD FOR DISTRIBUTING CARRIERS

CROSS-REFERENCE TO RELATED APPLICATIONS

This application claims priority to European Patent Application No. 21199467.8, filed 28 Sep. 2021, the disclosure of which is hereby incorporated by reference in its entirety.

TECHNICAL FIELD

The present disclosure relates to a distribution system and a method for distributing carriers using the distribution system. The system and method of the present disclosure, as an example, may be used for controlling movements of carriers transporting sample containers, in particular sample tubes, filled with biological fluids to be analyzed or reagents, and/or cassettes filled with reagents, specimen slides, tissue material, waste, disposables like pipette tips or tube caps, and/or empty tubes for aliquoting, specifically in the field of diagnostic laboratories. The system and method can also be used for other applications requiring controlling the movement of carriers on a transport plane, such as carriers transporting payloads such as goods, wares of a warehouse, products to be manufactured in a manufacturing site or other objects.

BACKGROUND

In the field of diagnostic laboratories, generally, a plurality of samples, for example liquid samples, have to be handled automatically. The automatic handling of samples may comprise automatically transporting sample containers, specifically sample containers comprising the samples to be handled, via carriers in the diagnostic laboratory by means of one or more distribution systems.

Despite the advantages achieved by known methods and devices, specifically for distribution systems where carriers contact and/or slide over the transport surface, several technical challenges remain. Specifically, automatically transporting carriers may cause enhanced wear of specific areas on a transport surface of the distribution system due to an unbalanced usage of the transport surface in terms of a number of carriers moving over the transport surface and/or a number of starts and stops on the transport surface.

Generally, it may be possible to identify areas with enhanced wear by determining delays and/or failed plans and to avoid these areas on the transport surface, for example as described in EP 3 537 159 A1. This document describes a method of operating a laboratory sample distribution system, wherein the laboratory sample distribution system comprises: a plurality of sample container carriers, wherein the sample container carriers are adapted to carry a laboratory sample container; a transport plane, wherein the transport plane is adapted to support the sample container carriers; and a plurality of drive elements, wherein the drive elements are adapted to move the sample container carriers on the transport plane. The method comprises the steps: a) planning a movement path for one of the sample container carriers from a start position to a destination position on the transport plane, wherein the transport plane is logically modelled by a plurality of nodes, wherein the nodes are free for at least one time-window or reserved for at least one-time window, wherein the planning comprises analyzing the reachability out of a free time-window of one of the nodes to free time-windows of at least one next node and at least one over-next node, such that a planned movement of the one sample container carrier is nonstop from the one node over the next node to the at least one over-next node, and reserving the planned movement path comprising a sequence of time-windows of nodes; and b) executing by controlling at least one of the drive elements, such that the one sample container carrier moves along the reserved movement path on the transport plane. However, plans may start to fail as the real wear affects predictability, slows down movement of the carriers, etc. If the router still plans with the model that works fine for a rather new surface and carriers, plans will start to fail when the system becomes worn down. The system may avoid identified areas of enhanced wear. However, some areas of the transport surface cannot be avoided to be able to reach a specific target position. Areas of enhanced wear may generally need to be renewed earlier than areas with less wear. Consequently, the costs for service of the transport system will be strongly determined by relatively short service intervals of areas with enhanced wear.

Further, distribution systems doing straight moves, specifically avoiding stops on straight paths, may be able to reduce wear. The router mechanism may allow for straight moves while minimizing stops during movement on the transport surface. However, this principle may not be suitable for distribution systems with high traffic densities of carriers.

Further, local wear grooves may be removed by grinding or polishing the transport surface from time to time, specifically if an absolute thickness of the transport surface is not critical for operation and the transport surface may be of sufficient thickness for having a long technical and economical life time, specifically in between two service intervals. Alternatively or additionally, the transport surface may be renewed more frequently. As an example, carriers with dummy-movement may be used for grinding or polishing. However, effort, service and material costs may generally be high and the distribution system may experience long downtimes due to service.

It is therefore desirable to provide methods and devices which at least partially address above-mentioned technical challenges.

SUMMARY

Although the embodiments of the present disclosure are not limited to specific advantages or functionality, it is noted that in accordance with the present disclosure a distribution system and a method for distributing carriers are provided which reduce or better distribute wear on the transport surface of the distribution system.

In accordance with one embodiment of the disclosure, a distribution system is provided comprising: a transport plane comprising logical positions, carriers for transporting objects, a drive system to move the carriers on the transport plane between logical positions, a control system configured for controlling the carriers to move on a planned route from a start position to a final destination position on the transport plane via logical positions, wherein the control system comprises a routing system configured for calculating routes for at least two carriers on the transport plane by modeling the transport plane with graphs of nodes, wherein the routing system is configured for calculating the planned routes considering balancing of surface usage of the transport plane, and wherein the routing system is configured for considering temporal blocking of logical positions and/or considering a variable move length and/or considering a variable reservation length.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
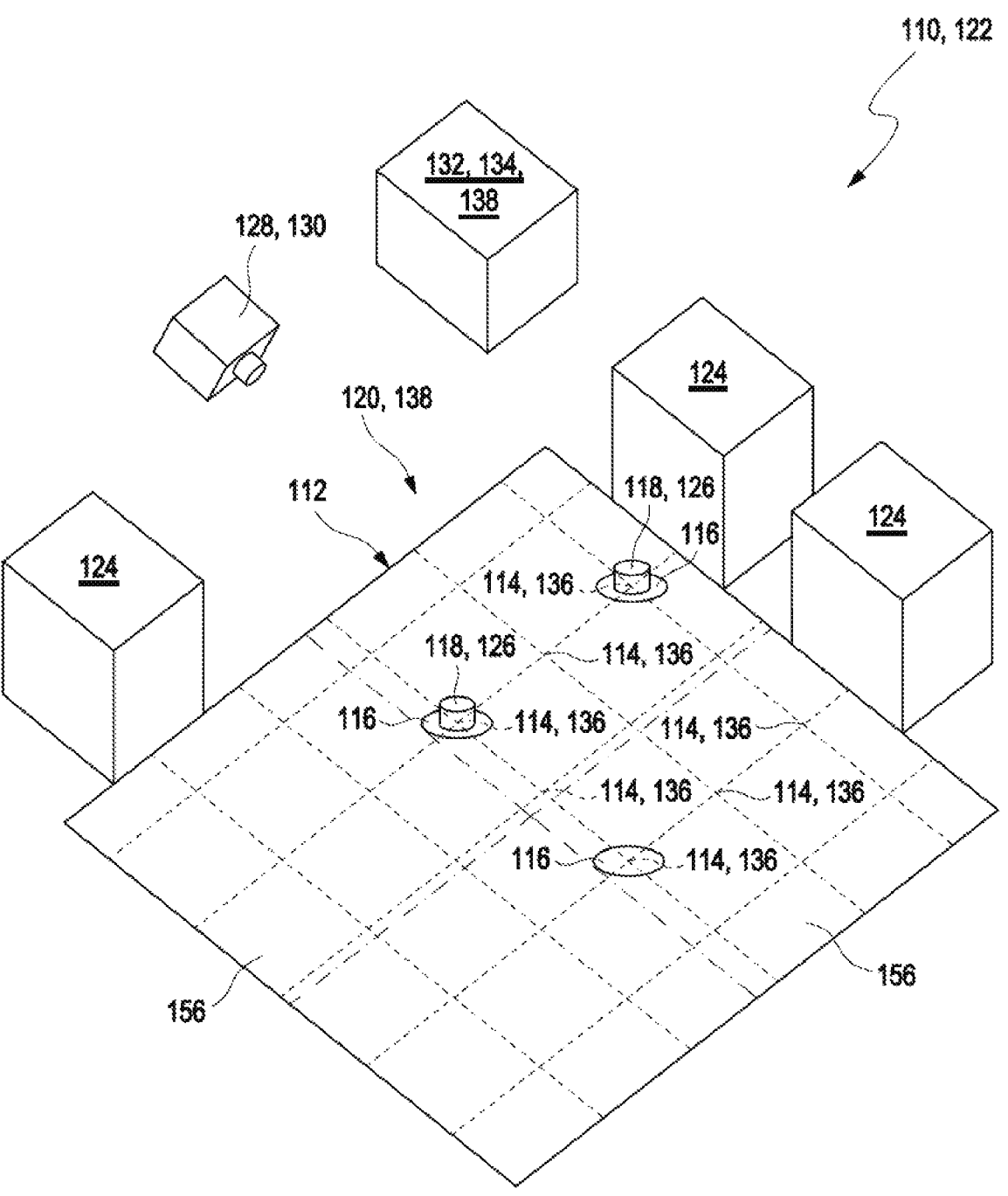
FIG. 1 shows an embodiment of a distribution system in a schematic view.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, notwithstanding the fact that the respective feature or element may be present once or more than once.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

In a first aspect, a distribution system is disclosed. The distribution system comprises a transport plane comprising logical positions,
carriers for transporting objects,
a drive system to move the carriers on the transport plane between logical positions,
a control system configured to control the carriers to move on a planned route from a start position to a final destination position on the transport plane via logical positions,
wherein the control system comprises a routing system configured to calculate routes for at least two carriers on the transport plane by modeling the transport plane with graphs of nodes, wherein the routing system is configured for calculating the planned routes considering balancing of surface usage of the transport plane, and wherein the routing system is configured for considering temporal blocking of logical positions and/or considering variable move length and/or a considering variable reservation length.

The term "system" as used herein is a broad term and is to be given its ordinary and customary meaning to a person of ordinary skill in the art and is not to be limited to a special or customized meaning. The term specifically may refer, without limitation, to an arbitrary set of interacting or interdependent components forming a whole. Specifically, the components may interact with each other in order to fulfill at least one common function. The at least two components may be handled independently or may be coupled or connect-able.

The term "distribution system" as used herein is a broad term and is to be given its ordinary and customary meaning to a person of ordinary skill in the art and is not to be limited to a special or customized meaning. The term specifically may refer, without limitation, to a system configured for distributing carriers from an initial position to a target destination. The distribution system may be an element of a laboratory automation system allowing to distribute carriers to a target destination within the laboratory automation system. Distribution systems may be used in laboratory automation systems comprising a number of laboratory stations, for example pre-analytical, analytical and/or post-analytical stations. Distribution system are generally known by the skilled person, e.g., from EP 3 095 739 A1 or WO2012/158541.

The term "object" as used herein is a broad term and is to be given its ordinary and customary meaning to a person of ordinary skill in the art and is not to be limited to a special or customized meaning. The term specifically may refer, without limitation, to arbitrary payload. The object may be at least one sample container such as laboratory diagnostic containers or vessels, e.g., sample containers, in particular sample tubes, filled with biological fluids to be analyzed or reagents, and/or cassettes filled with reagents, specimen slides, tissue material, waste, disposables like pipette tips or tube caps, and/or empty tubes for aliquoting, and the like.

The term "carrier" as used herein is a broad term and is to be given its ordinary and customary meaning to a person of ordinary skill in the art and is not to be limited to a special or customized meaning. The term specifically may refer, without limitation, to a support structure configured for supporting and transporting a payload. The carrier may be provided with appropriate holding means to support, and if required, to secure payload in a needed manner and orientation. The carrier can be self-propelling or can be propelled by and moved on a transport plane.

The term "transport plane" as used herein is a broad term and is to be given its ordinary and customary meaning to a person of ordinary skill in the art and is not to be limited to a special or customized meaning. The term specifically may refer, without limitation, to any kind of two dimensional plane, bed, layer, platform or base configured for transporting carriers. The transport plane may be configured such that carriers are positionable onto the transport plane, in particular on a surface of the transport plane, such that the carriers are movable in at least two dimensions along the transport plane. For instance, the transport plane may be a sliding surface mounted in a diagnostics laboratory or the floor of a manufacturing site or inside a manufacturing hall. The transport plane may be installed vertically or horizontally including slopes. Also curved transport planes may be possible.

The transport plane may be configured for providing movement of the carrier by contact. The transport plane may be configured such that a carrier can contact the surface of the transport plane, also denoted as transport surface, such that friction can be used to drive, stop and control movements of the carrier. The carrier will be in contact with the transport surface for a part of the node to node transportation duration. For instance when the carriers stop to wait for a next move. For a third dimension, either the transport plane may be formed correspondingly with corresponding limitations in upward and downward slope, or some kind of levitation mechanism may be installed such as magnetic levitation or air cushion technique with the corresponding limitations in reachable height without losing control. For vertical transportation in the third dimension elevators or paternoster mechanisms can also be installed.

The term "drive system" as used herein is a broad term and is to be given its ordinary and customary meaning to a person of ordinary skill in the art and is not to be limited to a special or customized meaning. The term specifically may refer, without limitation, to a system configured for moving the carriers on the transport plane. The drive system can be implemented in the carriers itself, e.g., wheels connected to an electric motor with or without connected battery and electronics. Another possibility are linear motors. Also possible are passive carriers. For instance, the carrier may comprise and/or may be at least one magnetic element. For example, a magnetic device is fixed in the carrier and/or the carriers may be made of a magnetic, e.g., paramagnetic, material. A magnetic force may be provided by magnetically active and drivable elements such as electro-magnetic coils, enforcing the carriers to move by generated electro-magnetic fields. The coils can be installed under, above, besides or in the transport plane. For instance, an arrangement of magnetic coils underneath the transport plane is described, e.g., in EP 2 566 787 or WO 2013/098202. Additionally or alternatively, the coils may be inside the carrier and the permanent magnets in the transport surface.

The term "logical position" is a broad term and is to be given its ordinary and customary meaning to a person of ordinary skill in the art and is not to be limited to a special or customized meaning. The term specifically may refer, without limitation, to an arbitrary location of the transport plane being adapted to support a carrier. A presentation of the transport plane may be a graph with logical positions or logical positions and allowed connections between them. The transport plane may be mathematically mapped to a graph of logical positions or a graph of logical positions and allowed connections between them. Routing, for example finding of routes, of the carriers on the logical positions may be performed using the graph. The drive system is configured for moving the carriers on the transport plane between the logical positions. The moving between the logical positions may comprise following the logical positions.

Logical positions may be defined on the transport plane by hardware requirements and/or by software. The logical position may be an imaginary position in the routing algorithm and/or a position on the real transport system. For example, a logical position may be defined on the transport plane as a position at which the carrier can stop, start and/or change direction. In systems such as described in EP 2 566 787 or WO 2013/098202, the drive system may define these logical positions by its hardware limitations. Logical positions may be defined above an electro-magnetic coil. At these positions, it may be possible to stop the carrier and to change its direction with the next move. The logical positions may be defined as wanted or required to form a useful set of crossing points, junctions, start and stop positions. The logical position may be a discrete position where the carrier can stop. In particular, the logical position may be defined by at least one physical entity of the drive system, such as an electromagnetic coil or a crossing of possible ways such as rails.

Each of the logical positions may be configured for being occupied by only one carrier. Thus, two carriers cannot share one logical position. The distribution system may be configured for moving a plurality of carriers on the transport plane via respective calculated partial routes, wherein the respective route may lead from a first logical position to a second logical position, i.e., the end position of the respective partial route.

A logical position can be any position reachable by the carriers or any position where the carriers can change direction, be parked or can be identified by an identification or registration system. Identification and registration systems can be a camera system or optical sensors and scanners identifying one or more of any optical signature on the carriers or object such as its size, its type, a bar code, a QR code, its payload. The barcode and/or QR code of may be used to identify the carrier. Alternatively or in addition, a RFID-reader system reading a unique RFID of the carrier or object on the carrier or sensors inside the transport plane can be used to identify logical positions and to localize the carriers. A further option can be high precision GPS, in particular enhanced with Wi-Fi, Bluetooth and/or GSM signals. Any other suitable alternative can be in principle also used.

The term "control system" as used herein is a broad term and is to be given its ordinary and customary meaning to a person of ordinary skill in the art and is not to be limited to a special or customized meaning. The term specifically may refer, without limitation, to an arbitrary system configured for performing the named operations, typically by using at least one data processing device and, more typically, by using at least one processor and/or at least one application-specific integrated circuit. Thus, as an example, the at least one control system may comprise at least one data processing device having a software code stored thereon comprising a number of computer commands. The control system may provide one or more hardware elements for performing one or more of the named operations and/or may provide one or more processors with software running thereon for performing one or more of the named operations. The control system may comprise one or more programmable devices such as one or more computers, application-specific integrated circuits (ASICs), Digital Signal Processors (DSPs), or Field Programmable Gate Arrays (FPGAs) which are configured to perform steps b) and c). The control system may comprise at least one computer. The computer can be an embedded computer, e.g., micro controller or programmable logic devices such as FPGAs. Additionally or alternatively, however, the control system may also fully or partially be embodied by hardware. The control system may comprise the routing system for calculating the routes and at least one executing unit for execution of movements of the carriers according to the planned routes.

The term "route" as used herein is a broad term and is to be given its ordinary and customary meaning to a person of ordinary skill in the art and is not to be limited to a special or customized meaning. The term specifically may refer, without limitation, to a set of partial routes from a start position to a final destination position. The route may be divided into one or more partial routes to intermediate destinations. The start position may be a logical position where the carrier stands on the transport plane when the algorithm starts calculating the route. The final destination position may be a logical position on the transport plane where the carrier needs to go to. Final destination positions are logical positions on the transport plane which have in particular a special functionality, e.g., where a sample tube, a part of the sample, or a consumable is handed over from or to the transport plane to or from, e.g., an analyzer or pre- or post-analytical system or storage system, and/or a second, separately routed area. For instance, areas for queuing, such as for temporarily storing, carriers may be managed by a separate algorithm (service in the computer) than the routing algorithms (routing service). For a manufacturing site, a final destination position may be in particular a logical position corresponding to a machine station performing some manufacturing process on a semi-finished good. A start position for one carrier can also be in particular a final destination position for another carrier or more in particular for the same carrier.

The executing unit may be configured for executing moves of the carrier considering the planned route. The term "move" may refer to an "action" and may not include the waiting time before the next move will take place. A move may be defined as one movement of a carrier in a straight line, starting from one logical position and stopping at a second, different logical position. A move can comprise a displacement of a carrier of one or multiple logical positions. The move length may be a number of logical positions for each move. Specifically, a move may be a straight-line displacement without stopping the carrier in between. Moving from a first final destination to a second final destination may be carried out in one or more moves with intermediate destinations. The intermediate destination may also be a logical position. Each move has a start and a stop on a logical position. The stop of a last move of a route is either an intermediate destination or a final destination. The routing system may be functionally a separate process from the execution unit. However these two processes can run on the same computer, on the same or multiple computation cores etc. or on different computers and/or microcontrollers etc.

The term "routing system" as used herein is a broad term and is to be given its ordinary and customary meaning to a person of ordinary skill in the art and is not to be limited to a special or customized meaning. The term specifically may refer, without limitation, to an arbitrary system configured for calculating routes for moving the carriers on the transport plane. The routing system may comprise at least one data processing device. The routing system may be configured for using at least one algorithm, in particular denoted as routing algorithm. A routing algorithm may be an algorithm calculating a route for each carrier on the transport plane from a start position to an intermediate destination position towards a final destination position. The routing algorithm may calculate several straight moves for each route starting with the current position of the carrier on a logical position as a starting position to an intermediate destination position. The planned route, also denoted as routing plan, may comprise all moves or only the next few moves to carry out until a second final destination is reached.

The routing system is configured for calculating the routes for carriers on the transport plane by modeling the transport plane with graphs of nodes. The term "node" as used herein is a broad term and is to be given its ordinary and customary meaning to a person of ordinary skill in the art and is not to be limited to a special or customized meaning. The term specifically may refer, without limitation, to a mathematical presentation of a logical position. The term "graph" as used herein is a broad term and is to be given its ordinary and customary meaning to a person of ordinary skill in the art and is not to be limited to a special or customized meaning. The term specifically may refer, without limitation, to a construct of nodes and possible connections between them.

The calculation of the routes may comprise determining shortest paths for the carriers across the transport plane from the start position to the final destination position. The shortest path may refer to a path which is shortest in time. However, the shortest path may additionally relate in some embodiments to shortest in space. The shortest path may be a minimum number of logical positions. The calculation of the routes may comprise finding efficient routes for getting rather short paths but taking into account the other traffic as well. The routing algorithm may be used for determining shortest paths for the carriers across the transport plane. The algorithm may be selected from the group consisting of: a A*-algorithm; a Windowed Hierarchical Cooperative A*-algorithm (WHCA*); a D*-algorithm; a Dijkstra's algorithm.

For example, a WHCA* search algorithm may be used for calculating the routes. With respect to WHCA* algorithm reference is made, e.g., to Silver, D., 2005, "Cooperative pathfinding", Young, R. M., and Laird, J. E., eds., AIIDE, 117-122. AAAIPress. The WHCA* search algorithm may be an informed search algorithm such as A* or D* searching algorithm. For each carrier with a final destination the search algorithm calculates a route from the start position to an intermediate destination position on nodes within the cooperative search window of time length T towards their respective final destination position. The search is cooperative because the route can only pass on free time windows of logical positions. For the logical positions with free time windows needed the required duration of the free time window will change from "free" to "reserved" for the required time slot of the respective logical positions. So the free time window will be split into a reserved time window and one or two further free time windows. The search is hence cooperative for the cooperative time window T by respecting the reserved time windows for other carriers of the logical positions. The WHCA* algorithm may be designed for planning a route for each carrier individually, wherein cooperation may be obtained using a reservation table.

As outlined above, the routing system may be configured to calculate routes for all carriers on the transport plane by modelling the transport plane with a graph of nodes. To do so, the routing system may be configured to determine reserved and free time windows for each node. To calculate routes for the carriers, the routing system may use a windowed hierarchical cooperative informed search algorithm with cooperative time window T. In particular the cooperative informed search algorithm is a Dijkstra-, Bellman-Ford- or more in particular an A*-algorithm. T is typically in the range of 1 to 300 secs, in particular from 1 to 60 secs, more particular 10 secs. The routing system may be configured to assign an individual reservation length as a number of nodes for the next move on logical positions with free time windows for each carrier, so that the carriers start and stop individually. The executing unit may be configured for executing the planned routes for transporting the carriers from their respective start position to their respective final position.

The calculation of the routes may comprise planning the routes. The routing system may be configured for determining optimal routes for the carriers across the transport plane. The optimal route may be determined in terms of at least one optimization target such as one or more of time, resource consumption, cost, wear balancing, good overall transport performance. Since the routing algorithm used may be cooperative, the routing system may take care that all carriers find their way through in a net efficient way, if necessary, sacrificing the shortest times to the final destinations of individual carriers. The optimal route for a respective carrier may be a route selected from a plurality of possible routes which minimizes the optimization target, e.g., the time needed for reaching its final destination position.

The routing system is configured for calculating the planned routes considering balancing of surface usage of the transport plane. Specifically, the present disclosure proposes solutions for reducing wear of areas on the transport plane due to an unbalanced usage of areas of the transport plane in terms of number of carriers moved over that surface and/or the number of starts and stops on the positions. This wear can be a result of friction caused by the carriers transported on the surface along preferential routes. The term "surface usage" as used herein is a broad term and is to be given its ordinary and customary meaning to a person of ordinary skill in the art and is not to be limited to a special or customized meaning. The term specifically may refer, without limitation, to usage of areas of the transport plane in terms of number of carriers moved over that surface and/or the number of starts and stops on the logical positions in absolute terms or per time period. The term "balancing" as used herein is a broad term and is to be given its ordinary and customary meaning to a person of ordinary skill in the art and is not to be limited to a special or customized meaning. The term specifically may refer, without limitation, to one or more of equalizing or compensating. The routing system is configured for considering temporal blocking of logical positions and/or a considering variable move length and/or a considering variable reservation length. The term "considering" as used herein is a broad term and is to be given its ordinary and customary meaning to a person of ordinary skill in the art and is not to be limited to a special or customized meaning. The term specifically may refer, without limitation, to one or more of determining, including, or taking into account temporal blocking of logical positions and/or a variable move length and/or a variable reservation length. Considering temporal blocking of logical positions and/or the variable move length and/or the variable reservation length may comprise including at least one constraint of temporal blocked logical positions and/or the variable move length and/or the variable reservation length for calculating the routes of carriers.

For example, wear of areas on the transport plane that would normally be used very intensively may be reduced by distributing the surface usage by temporarily blocking of positions. The routing system may be configured for defining at least two patterns of blocked logical positions. One of the patterns may force the routing system to calculate first routes for the carriers and another one of the patterns may force the routing system to calculate second routes for the carriers. The term "force" as used herein is a broad term and is to be given its ordinary and customary meaning to a person of ordinary skill in the art and is not to be limited to a special or customized meaning. The term specifically may refer, without limitation, to setting boundaries for potential nodes and/or influencing a selection of nodes for the moves.

The term "pattern" as used herein is a broad term and is to be given its ordinary and customary meaning to a person of ordinary skill in the art and is not to be limited to a special or customized meaning. The term specifically may refer, without limitation, to a defined distribution or selection of nodes. The term "blocking" as used herein is a broad term and is to be given its ordinary and customary meaning to a person of ordinary skill in the art and is not to be limited to a special or customized meaning. The term specifically may refer, without limitation, to excluding at least one logical position, in particular node, that shall not be used from further consideration by the routing algorithm. The patterns may comprise at least one low traffic pattern having a first number of blocked logical positions and at least one high traffic pattern with a second number of blocked logical positions, wherein the second number is reduced in comparison to the first number. The blocked logical positions may be arranged to block the number of different options for carriers to move. The blocked logical positions may be arranged to force carriers to follow one or more unique paths. For example, all positions are blocked that shall not be used. This may make it easier for the routing system to find routes. The blocking may refer to adapting the width of the surface to the traffic intensity needs. For example, in case of a low traffic situation, it may be sufficient to transport it over one logical position wide surface. If a surface of three positions width is offered, the shortest routes will be chosen and probably all carriers will move over the same logical positions. In case of a high traffic situation and again three positions wide surface, probably more positions will be used, thus a better usage balancing. In case of the lower-traffic situation there may be need to balance the usage by continuously switching the available, but purposely limited surface in an alternating way. Therefore, less but strategically chosen positions to block may be used which may leave sufficient area for the carriers to move but, due to shortest path searching, also influences the planning of the routes. Positions close to the start and destination position cannot be avoided as easily as the other positions.

The patterns may be defined during run-time or during installation and/or configuration and/or initialization of the distribution system. Additionally or alternatively, the patterns may be defined manually by receiving user input via at least one communication interface and/or may be computed automatically by algorithms. The term "communication interface" as used herein is a broad term and is to be given its ordinary and customary meaning to a person of ordinary skill in the art and is not to be limited to a special or customized meaning. The term specifically may refer, without limitation, to an item or element forming a boundary configured for transferring information. In particular, the communication interface may be configured for transferring information from a computational device, e.g., a computer, such as to send or output information, e.g., onto another device. Additionally or alternatively, the communication interface may be configured for transferring information onto a computational device, e.g., onto a computer, such as to receive information. The communication interface may specifically provide means for transferring or exchanging information. In particular, the communication interface may provide a data transfer connection, e.g., via cable, Bluetooth, NFC, inductive coupling or the like. As an example, the communication interface may be or may comprise at least one port comprising one or more of a network or internet port, a USB-port and a disk drive. The communication interface may be at least one web interface.

The term "temporal blocking" as used herein is a broad term and is to be given its ordinary and customary meaning to a person of ordinary skill in the art and is not to be limited to a special or customized meaning. The term specifically may refer, without limitation, to time-dependent usage of a pattern. The routing system may be configured for switching from one pattern to another pattern after a predefined time and/or based on the number of carriers moved over a certain area of the transport plane. The moving over the certain area may comprise moving, starting and/or stopping of carriers in the certain area. The certain area may be one or more of predetermined, predefined or determinable. The switching may comprise activating and deactivating the patterns. The number of carriers moved over a certain area may be a traffic intensity. The area may be a logical sub-area or field of the transport plane. The term "field" as used herein is a broad term and is to be given its ordinary and customary meaning to a person of ordinary skill in the art and is not to be limited to a special or customized meaning. The term specifically may refer, without limitation, to a unit of the transport plane comprising at least one logical position. The predefined time may be a time period selected from a number of: minute, hour, day, or week.

The control system may be configured for measuring the number of carriers which have been using the certain area of the transport plane since the last switch. The certain area may be one or more of predetermined, predefined or determinable. The distribution system may comprise an increment counter for fields of the transport plane, in particular for each field. The increment counter may be configured for counting a number of carriers moved over the respective field, in particular the number of carriers starting and/or stopping on a respective logical position. The routing system may be configured for switching to another pattern if a defined threshold, specifically an absolute threshold and/or a relative threshold, has been reached. The counted number of carriers may be compared with the threshold. Additionally or alternatively, one or more of the median usage, average usage, minimum usage, or maximum usage of the respective fields may be compared to a corresponding threshold. The threshold can, in principle, be an arbitrary number. For example, if switching is intended for each hour, the threshold may depend on a number of expected carriers transported in an hour or day. For example, the expected number of carriers per hour may be in the order of 1 k carriers per hour or 6 k, 12 k or 22 k or even more carriers per field. For example, the control system may switch from one pattern to another when a threshold of 6 k, 12 k or 22 k may be exceeded. Additionally or alternatively, the threshold may be based on percentage excess usage instead of absolute values, e.g., 20%, 50%, 100% of one or more of an absolute number of carriers, median, average, minimum, or maximum usage. Other thresholds and numbers are possible.

In order to avoid capacity problems when too much traffic would be sent over the limited remaining paths, the restrictions can be at least partially activated and at least partially deactivated, based on the traffic intensity. At high traffic density, the surface usage may be more equally balanced anyway, such that less positions may need to be blocked.

This proposed technique can be added to other routers without having to change router code. There is no overhead of continuously taking into account the wear reduction in the router algorithms and it can even reduce the routing system's computation time as it reduces the number of potential moves.

In systems with areas with rather low traffic intensity, the moves will frequently have the maximum reservation length. Due to this, the start or stop positions will frequently be the same for many moves and thus lead to a strong usage imbalance and wear of these positions accordingly. The routing system is configured for considering a variable move length and/or a variable maximum reservation length. For example, the routing system may be configured for using variable move lengths for one or more of: a selection of moves, a certain number of carriers, a certain time period, predefined areas of the transport plane. For example, the routing system may be configured for using variable move lengths for all carriers and/or all moves.

For example, the move lengths for each move may be varied. If frequently the maximum move lengths can be carried out due to low traffic density, start and stop will take place frequently on the same positions. The routing system may be configured for varying the move lengths for each move of a carrier along a route. By varying the move lengths for each move, the positions can be used in a better-balanced way.

The routing system may be configured for varying only the length of a first move of the carriers, specifically varying the length of a first move of the carriers such that the carriers stop and/or start on different logical positions. The term "first move" may refer to a first move from a starting position, in particular in a stepwise movement comprising a plurality of moves already by varying only the move length of the first move a better balancing can be obtained.

The control system may be configured for measuring the number of carriers which have been using a logical position. As outlined above, the distribution system may comprise an increment counter for each field of the transport plane, counting the number of carriers that moved over, started or stopped on a respective logical position. The word "using" may refer to stopping and/or starting on a logical position, or moving over a logical position. The routing system may be configured for comparing the measured number of carriers of neighboring logical positions with a defined threshold and to adapt the move length depending on the comparison. The threshold may be defined and embodied as specified with respect to switching above.

As outlined above, the control system may be configured for measuring the number of carriers which have been using a logical position. The routing system may be configured for using the measured number as weight factor for optimizing the move length. The routing system may be configured to prioritize using logical positions with low weight.

The routing system may be configured for allocating a cost-function to each of the logical positions. The cost-function may be increased depending on the measured number of carriers having used the logical position. The routing system may be configured to prioritize logical positions with low cost-functions.

The routing system may be configured for using a variable reservation length for all or a selection, e.g., defined or randomly, of moves in a defined area of the transport plane. The routing system may be configured for reducing a maximum reservation length for all or a selection of moves in a defined area of the transport plane. Alternatively, the routing system may be configured for increasing a minimum reservation length for all or a selection of moves in a defined area of the transport plane. The reduction of the maximum reservation length and/or the increase of the minimum reservation length may be used for one or more of each carrier or randomly for carriers. The reduction of the maximum reservation length and/or the increase of the minimum reservation length may be performed for a certain time period.

For example, in order to consider balancing of surface usage of the transport plane, the plans for moves may be corrected in, e.g., defined areas. The correction may be performed for a certain time period. Instead of making moves with maximum reservation length, the reservation length may be reduced for all or just a few moves in a defined area. This reduction can be for each carrier or randomly for carriers. The reduction of the reservation length can be done randomly. For example, only the maximum move length of the first step is varied. This will have a similar effect, as it may affect the start-stop positions of the following moves as well in lower-traffic situations. In high-traffic situations, the reservation lengths may be typically less than the maximum reservation length because of the high density of carriers. The first move can also be carried out as a first fictitious or fictive target, reached by only 1 move. The end position of the first move can be varied randomly or in a determined way such that the number of first steps from a certain start position with length n per time period is equal for $n=1, \ldots, n_{max}$, with $n_{max}$ the maximum reservation length.

The term "reservation length" as used herein is a broad term and is to be given its ordinary and customary meaning to a person of ordinary skill in the art and is not to be limited to a special or customized meaning. The reservation length may comprise the logical positions that will be reserved to make the move. The term "maximum reservation length" as used herein is a broad term and is to be given its ordinary and customary meaning to a person of ordinary skill in the art and is not to be limited to a special or customized meaning. The maximum reservation length may be defined to avoid situations where too many logical positions are reserved at once, which would lead to blocking these positions for other carriers for a too long time. The routing algorithm may comprise a model for estimating the times the moves will take for a given move length. This may allow to determine a complete time plan for reserving the logical positions. This time plan may comprise moving times as well as waiting times until next moves can be made.

In a further aspect a method for distributing carriers using a distribution system according to the present disclosure is disclosed.

The method steps may be performed in the given order or may be performed in a different order. Further, one or more additional method steps may be present which are not listed. Furthermore, one, more than one or even all of the method steps may be performed repeatedly.

The method comprises moving the carriers on the transport plane of the distribution system between logical positions by using the drive system. The method comprises controlling the carriers to move on a planned route from the start position to the final destination position on the transport plane via logical positions by using the control system. The method comprises calculating the planned route for at least two carriers on the transport plane by modeling the transport plane with graphs of nodes by using the routing system. The calculating comprises considering balancing of surface usage of the transport plane. The calculating comprises considering temporal blocking of logical positions and/or considering a variable move length and/or considering a variable reservation length.

For details, options and definitions, reference may be made to the distribution system as discussed above. Thus, specifically, as outlined above, the method may comprise using the distribution system according to the present disclosure, such as according to one or more of the embodiments given above or given in further detail below.

Further disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1. A distribution system comprising a transport plane comprising logical positions, carriers for transporting objects, a drive system to move the carriers on the transport plane between logical positions, a control system configured for controlling the carriers to move on a planned route from a start position to a final destination position on the transport plane via logical positions, wherein the control system comprises a routing system configured for calculating routes for at least two carriers on the transport plane by modeling the transport plane with graphs of nodes, wherein the routing system is configured for calculating the planned routes considering balancing of surface usage of the transport plane, and wherein the routing system is configured for considering temporal blocking of logical positions and/or a considering variable move length and/or a considering variable reservation length.

Embodiment 2. The distribution system according to embodiment 1, wherein the calculation of the routes comprises determining shortest paths for the carriers across the transport plane from the start position to the final destination position.

Embodiment 3. The distribution system according to embodiment 2, wherein at least one algorithm is used for determining shortest paths for the carriers across the transport plane, wherein the algorithm is selected from the group consisting of: a A*-algorithm; a Windowed Hierarchical Cooperative A*-algorithm (WHCA*); a D*-algorithm; a Dijkstra's algorithm.

Embodiment 4. The distribution system according to any one of embodiments 1 to 3, wherein the routing system is configured for defining at least two patterns of blocked logical positions, wherein one of the patterns forces the routing system calculating first routes for the carriers and another one of the patterns forces the routing system calculating second routes for the carriers different from the first routes.

Embodiment 5. The distribution system according to embodiment 4, wherein the patterns are defined during run-time or during installation and/or configuration and/or initialization of the distribution system.

Embodiment 6. The distribution system according to any one of embodiments 4 or 5, wherein the patterns are defined manually by receiving user input via at least one communication interface and/or are computed automatically by algorithms.

Embodiment 7. The distribution system according to any one of embodiments 4 to 6, wherein the routing system is configured for switching from one pattern to another pattern after a predefined time and/or based on the number of carriers moved over a certain area of the transport plane.

Embodiment 8. The distribution system according to embodiment 7, wherein the predefined time is a time period selected from a number of: minute, hour, day, or week.

Embodiment 9. The distribution system according to any one of embodiments 7 or 8, wherein the control system is configured for measuring the number of carriers which have been using the certain area of the transport plane since the last switch, wherein the routing system is configured for switching to another pattern if a defined threshold, specifically an absolute threshold and/or a relative threshold, has been reached.

Embodiment 10. The distribution system according to any one of embodiments 4 to 9, wherein the switching comprises activating and deactivating the patterns.

Embodiment 11. The distribution system according to any one of embodiments 4 to 10, wherein the patterns comprise at least one low traffic pattern having a first number of blocked logical positions and at least one high traffic pattern with a second number of blocked logical positions, wherein the second number is reduced in comparison to the first number.

Embodiment 12. The distribution system according to any one of embodiments 1 to 11, wherein the blocked logical positions are arranged to block the number of different options for carriers to move.

Embodiment 13. The distribution system according to any one of embodiments 1 to 12, wherein the routing system is configured for using variable move lengths for one or more of: a selection of moves, a certain number of carriers, a certain time period, defined areas of the transport plane.

Embodiment 14. The distribution system according to embodiment 13, wherein the routing system is configured for varying only the length of a first move of the carriers, specifically varying the length of a first move of the carriers such that the carriers stop and/or start on different logical positions.

Embodiment 15. The distribution system according to any one of embodiments 13 or 14, wherein the routing system is configured for varying the move lengths for each move of a carrier along a route.

Embodiment 16. The distribution system according to any one of embodiments 14 or 15, wherein the control system is configured for measuring the number of carriers which have been using a logical position, wherein the routing system is configured for comparing the measured number of carriers of neighboring logical positions with a defined threshold and to adapt the move length depending on the comparison.

Embodiment 17. The distribution system according to any one of embodiments 14 to 16, wherein the control system is configured for measuring the number of carriers which have been using a logical position, wherein the routing system is configured for using the measured number as weight factor for optimizing the move length, wherein the routing system is configured to prioritize using logical positions with low weight.

Embodiment 18. The distribution system according to embodiment 17, wherein the routing system is configured for allocating a cost-function to each of the logical positions, wherein the cost-function is increased depending on the measured number of carriers having used the logical position, wherein the routing system is configured to prioritize logical positions with low cost-functions.

Embodiment 19. The distribution system according to any one of embodiments 1 to 18, wherein the routing system is configured for using a variable reservation length for all or a selection of moves in a defined area of the transport plane.

Embodiment 20. The distribution system according to embodiment 19, wherein the routing system is configured for reducing a maximum reservation length for all or a selection of moves in a defined area of the transport plane.

Embodiment 21. The distribution system according to any one of embodiments 19 or 20, wherein the routing system is configured for increasing a minimum reservation length for all or a selection of moves in a defined area of the transport plane.

Embodiment 22. The distribution system according to any one of embodiments 19 to 21, wherein the reduction of the maximum reservation length and/or the increase of the minimum reservation length is used for one or more of each carrier or randomly for carriers.

Embodiment 23. The distribution system according to any one of embodiments 1 to 22, wherein the control system comprises at least one executing unit configured for executing the planned routes for transporting the carriers from their respective start position to their respective final position.

Embodiment 24. A method for distributing carriers using a distribution system according to any one of embodiments 1 to 23, wherein the method comprises moving the carriers on the transport plane of the distribution system between logical positions by using the drive system, wherein the method comprises controlling the carriers to move on a planned route from the start position to the final destination position on the transport plane via logical positions by using the control system, wherein the method comprises calculating the planned route for at least two carriers on the transport plane by modeling the transport plane with graphs of nodes by using the routing system, wherein the calculating comprises considering balancing of surface usage of the transport plane, and wherein the calculating comprises considering temporal blocking of logical positions and/or considering a variable move length and/or considering a variable reservation length.

In order that the embodiments of the present disclosure may be more readily understood, reference is made to the following examples, which are intended to illustrate the disclosure, but not limit the scope thereof.

FIG. 1 shows an exemplary embodiment of a distribution system 110 in a schematic view. The distribution system 110 comprises a transport plane 112 comprising logical positions 114, carriers 116 for transporting objects 118 and a drive system 120 to move the carriers 116 on the transport plane 112 between logical positions 114.

The distribution system 110 may be an element of a laboratory automation system 122 allowing to distribute carriers 116 to a target destination within the laboratory automation system 122. As can be seen in FIG. 1, the distribution system 110 may be used in a laboratory automation system 122 comprising a number of laboratory stations 124, for example pre-analytical, analytical and/or post-analytical stations. Thus, in the exemplary embodiment of FIG. 1, the object 118 may be at least one sample container 126, such as laboratory diagnostic containers or vessels.

The carriers 116 may specifically be passive carriers. In the exemplary embodiment of FIG. 1, a magnetic device is fixed in the carrier 116 and a magnetic force provided by magnetically active and drivable elements (not shown in FIG. 1), such as electro-magnetic coils, enforcing the carriers 116 to move by generated electro-magnetic fields. For example, the electro-magnetic coils may be installed under the transport plane 112, such as exemplarily described, e.g., in EP 2 566 787 or WO 2013/098202. However, an arrangement of the coils above, besides or in the transport plane 112 is also feasible. Thus, in this example, the drive system 120 may define the logical positions 114 by its hardware limitations. Logical positions 114 may be defined above an electro-magnetic coil. At these positions, it may be possible to stop the carrier 116 and to change its direction with the next move.

As can be seen in FIG. 1, the distribution system 110 may further comprise at least one identification and registration system 128. The identification and registration systems 128 can be a camera system 130 or optical sensors and scanners identifying any optical signature on the carriers 116 or object 118 one or more of any optical signature on the carriers or object such as its size, its type, a bar code, a QR code, its payload. The barcode and/or QR code of may be used to identify the carrier 116. However, other options, such as a RFID-reader system or a high precision GPS, in particular enhanced with Wi-Fi, Bluetooth and/or GSM signals, are feasible. Any other suitable alternative can be in principle also used.

The distribution system 110 further comprises a control system 132 configured to control the carriers 116 to move on a planned route from a start position to a final destination position on the transport plane 112 via logical positions 114. The start position and the final destination position may specifically be at least one of the logical positions 114 on the transport plane 112.

The control system 132 comprises a routing system 134 configured to calculate routes for at least two carriers 116 on the transport plane 112 by modeling the transport plane 112 with graphs of nodes 136. The routing system 134 is configured for calculating the planned routes considering balancing of surface usage of the transport plane 112, wherein the routing system 134 is configured for considering temporal blocking of logical positions 114 and/or considering a variable move length and/or considering a variable reservation length.

The control system 132 may further comprise at least one executing unit 138. The executing unit 138 may be configured for executing the planned routes for transporting the carriers 116 from their respective start position to their respective final position. Specifically, the executing unit 138 may be configured for execution of movements of the carriers 116 according to the planned routes. In the exemplary embodiment of FIG. 1, the executing unit 138 may at least partially be integrated into the drive system 120 and, as an example, may be configured for executing moves of the carrier 116 considering the planned route, such as by controlling the drive system 120, specifically the electro-magnetic coils of the drive system 120.

The calculation of the routes may comprise determining shortest paths for the carriers 116 across the transport plane 112 from the start position to the final destination position. A routing algorithm may be used for determining shortest paths for the carriers 116 across the transport plane 112. The algorithm may be selected from the group consisting of: a A*-algorithm; a Windowed Hierarchical Cooperative A*-algorithm (W HCA*); a D*-algorithm; a Dijkstra's algorithm.

Figure 2:
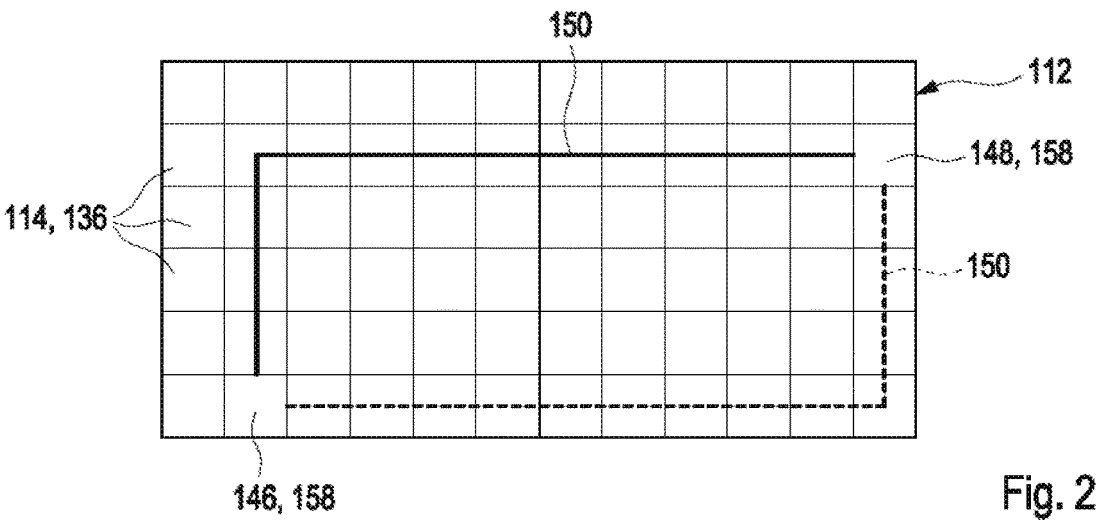
FIGS. 2A to 2D show exemplary patterns of blocked logical positions on a transport plane of a distribution system.
Figure 2:
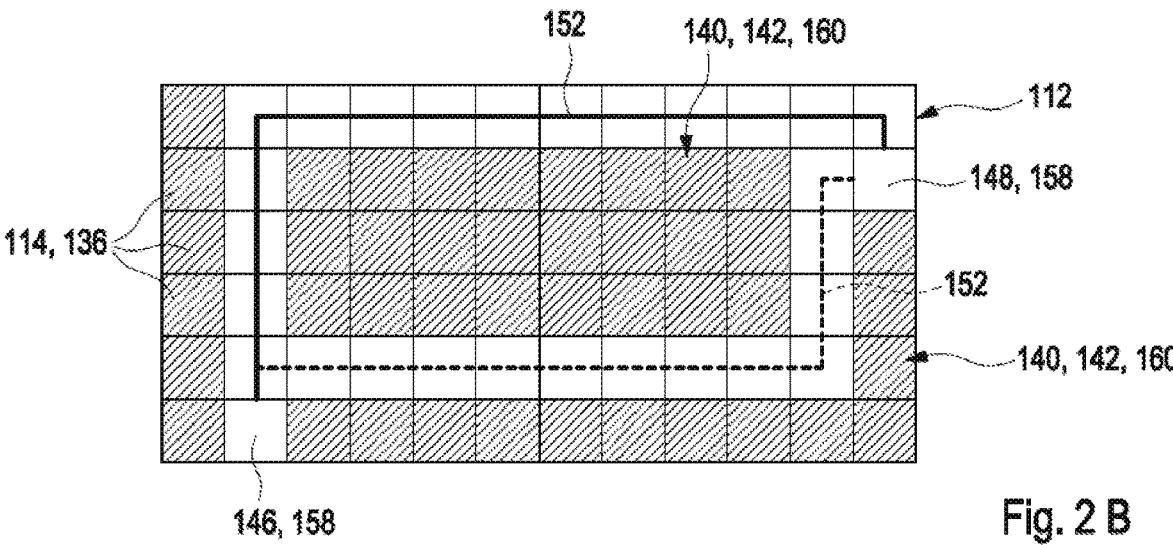
Figure 2:
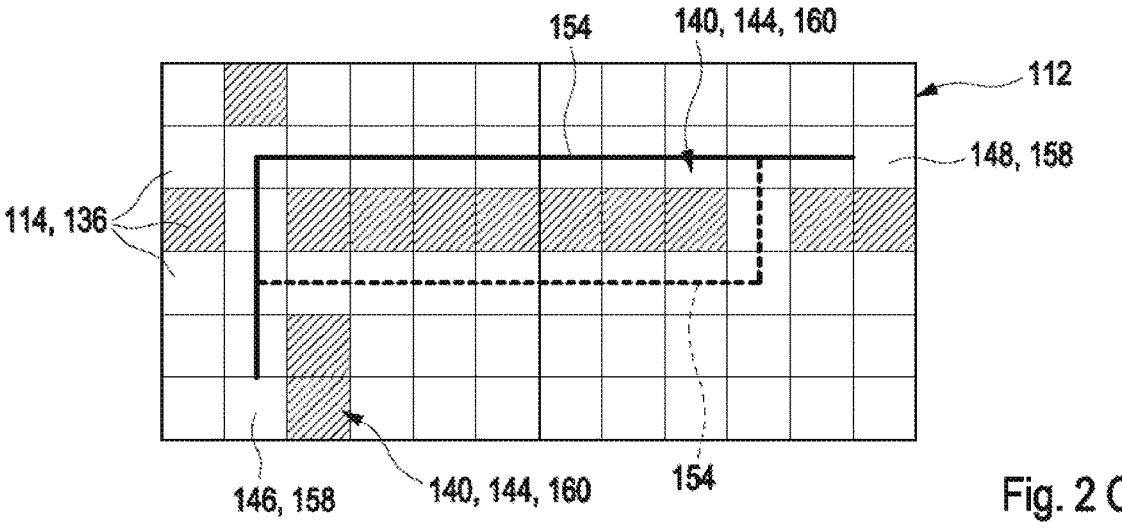
Figure 2:
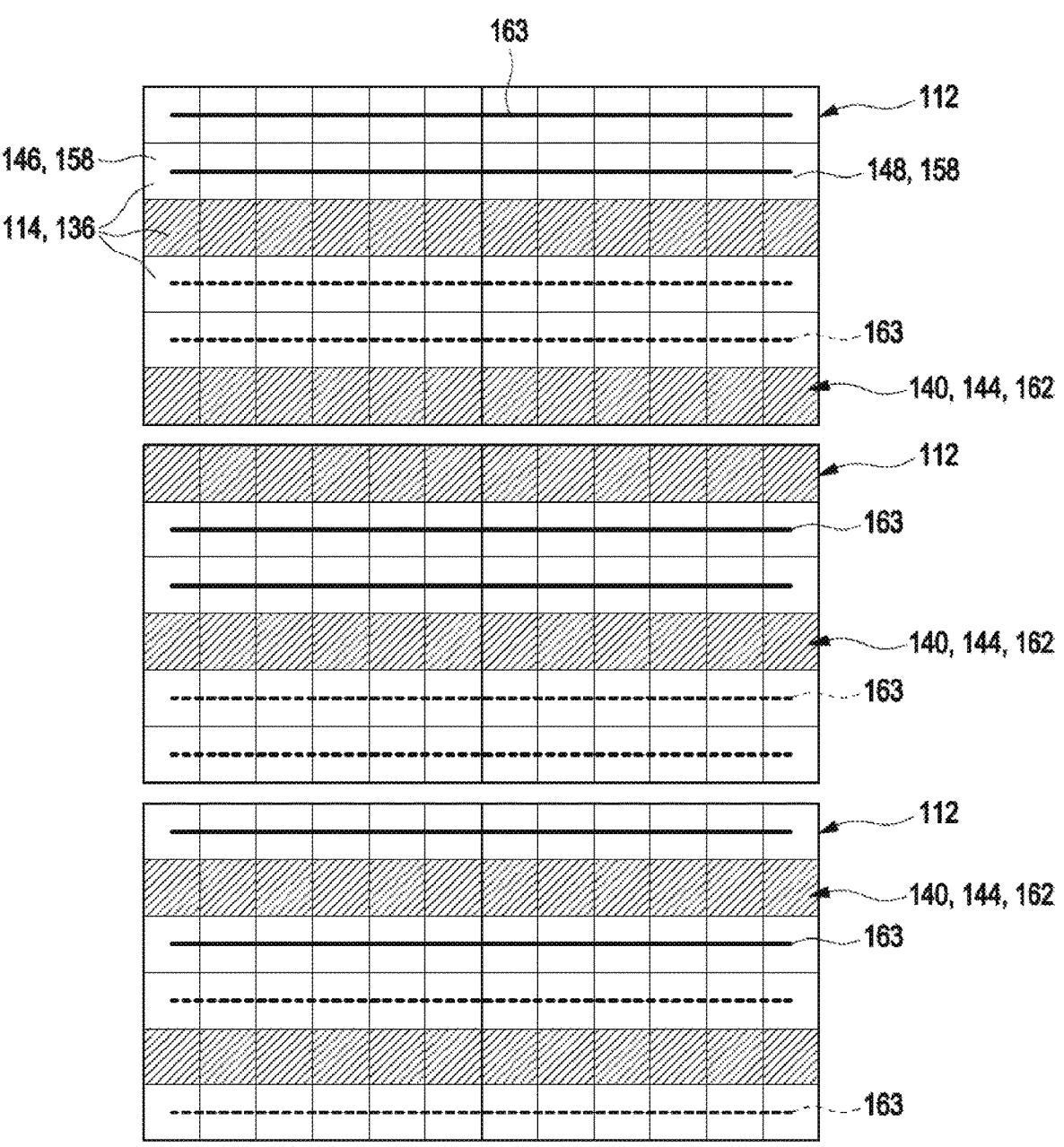

As outlined above, the routing system 134 is configured for considering temporal blocking of logical positions 114. In FIGS. 2A to 2D, exemplary patterns of blocked logical positions 140 on the transport plane 112 of the distribution system 110 are shown. Specifically, FIG. 2A shows the transport plane 112 with no pattern of blocked logical positions 140, FIG. 2B shows the transport plane 112 with a first pattern of blocked logical positions 142 and FIG. 2C shows the transport plane 112 with a second pattern of blocked logical positions 144.

As can be seen in FIG. 2A, the carriers 116 may be free to move on the transport plane 112 from the start position 146 to the final destination position 148. The carriers 116 may take with high probability one of the shown unrestricted routes 150 resulting in high wear of the area on the transport plane 112 via the unrestricted routes 150.

The present disclosure proposes solutions for reducing wear of areas on the transport plane 112 due to an unbalanced usage of areas of the transport plane 112 in terms of number of carriers 116 moved over that surface and/or the number of starts and stops on the logical positions 114 in absolute terms or per time period. For example, wear of areas on the transport plane 112 that would normally be used very intensively may be reduced by distributing the surface usage by temporarily blocking of positions 114. The routing system 134 may be configured for defining at least two patterns of blocked logical positions 140. One of the patterns 140, 142, as exemplarily shown in FIG. 2B, may force the routing system 134 to calculate first routes 152 for the carriers 116 and another one of the patterns 140, 144, as exemplarily shown in FIG. 2C, may force the routing system 134 to calculate second routes 154 for the carriers 116. As can be seen in FIGS. 2A to 2C, the unrestricted routes 150, the first routes 152 and the second routes 154 may be different from each other, thus reducing wear of the transport plane 112. However, the blocked logical positions 114 may be arranged to block the number of different options for carriers 116 to move. The figure shows two paths, one dashed and one continuous. This situation is suitable for carriers 116 moving in two directions, to and from a starting point. If there would be one possible path only, the carriers

116 moving in opposite directions would block each other too much. So here a good solution would be to block it in such a way that bi-directional transport is possible without much interference. The blocked positions make it impossible to use those positions for a while and, by smartly defining the patterns, the carriers 116 will (mostly) either follow the remaining path(s). Specifically, in each of the patterns of blocked logical positions 140, 142, 144 shown in FIGS. 2B and 2C, at least two routes 152, 154 may still be allowed on which the carriers 116 can move from the start position 146 to the final destination position 148.

The patterns 140 may be defined during run-time or during installation and/or configuration and/or initialization of the distribution system 110. Additionally or alternatively, the patterns 140 may be defined manually by receiving user input via at least one communication interface and/or may be computed automatically by algorithms.

The routing system 134 may be configured for switching from one pattern 140 to another pattern 140, for example from the first pattern 142 to the second pattern 144 of block logical positions, after a predefined time and/or based on the number of carriers 116 moved over a certain area of the transport plane 112. The switching may comprise activating and deactivating the patterns 140. The number of carriers 116 moved over a certain area may be a traffic intensity. The area may be a logical sub-area 156, as exemplarily shown by the dotted lines in FIG. 1, or a field 158 of the transport plane 112. The predefined time may be a time period selected from a number of: minute, hour, day, or week.

The control system 132 may be configured for measuring the number of carriers 116 which have been using the certain area of the transport plane 112 since the last switch. The distribution system 110 may comprise an increment counter (not shown in the Figures) for fields 158 of the transport plane 112, in particular for each field 158. The increment counter may be configured for counting a number of carriers 116 that moved over the respective field 158, in particular the number of carriers 116 starting and/or stopping on a respective logical position 114. The routing system 134 may be configured for switching to another pattern 140 if a defined threshold, specifically an absolute threshold and/or a relative threshold, has been reached. The counted number of carriers 116 may be compared with the threshold. Additionally or alternatively, one or more of the median usage, average usage, minimum usage, or maximum usage of the respective fields 158 may be compared to a corresponding threshold. The threshold can, in principle, be an arbitrary number. For example, if switching is intended for each hour, the threshold may depend on a number of expected carriers 116 transported in an hour or day. For example, the expected number of carriers 116 per hour may be in the order of 1 k carriers per hour or 6 k, 12 k or 22 k or even more carriers 116 per field 158. For example, the control system 132 may switch from one pattern 140 to another when a threshold of 6 k, 12 k or 22 k may be exceeded. Additionally or alternatively, the threshold may be based on percentage excess usage instead of absolute values, e.g., 20%, 50%, 100% of one or more of an absolute number of carriers 116, median, average, minimum, or maximum usage. Other thresholds and numbers are possible.

As can be seen in FIGS. 2B and 2C, the patterns 140 may comprise at least one low traffic pattern 160 having a first number of blocked logical positions 114. In FIG. 2D, the pattern 140 may be a high traffic pattern 162 with a second number of blocked logical positions 114. The second number of blocked logical positions 114 may be reduced in comparison to the first number of blocked logical positions 114. FIGS. 2B and 2C are both for the same traffic intensity. In the case of FIG. 2D, multiple paths 163 are available for carriers 116 moving in each direction. However, depending on the routing algorithm, not all carriers 116 for one direction need to follow only the dashed or continuous lines. This is illustrated in FIG. 2D to show there are multiple paths 163 possible. Also, the carriers 116 may change path while travelling from left to right and vice versa. The different patterns in FIG. 2D show that over time, positions are blocked and unblocked for forcing the carriers 116 to use as many positions of the transport plane 112 as possible in a balanced way.

Figures 3A, 3B, 3C:
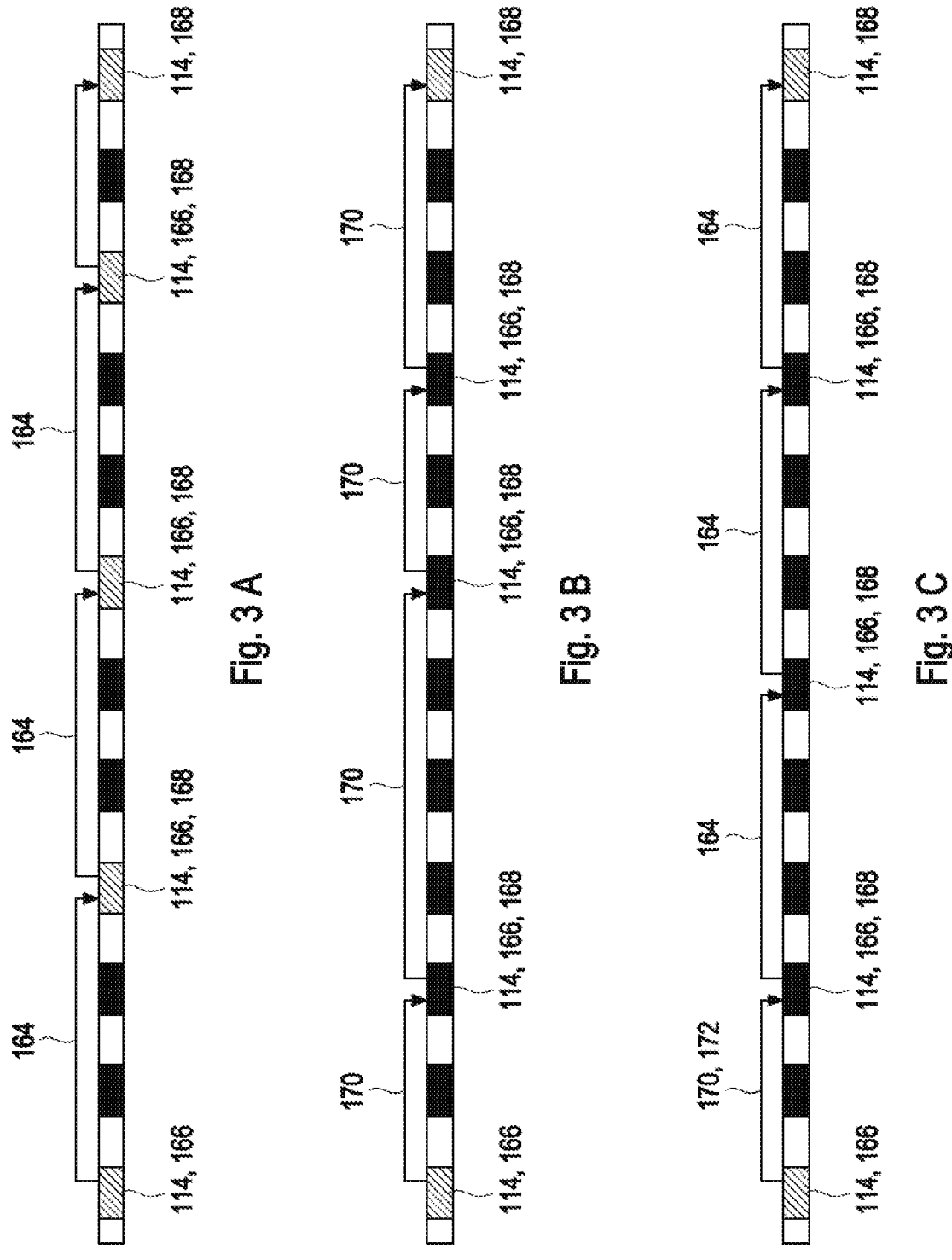
FIGS. 3A to 3C show schematically variable move lengths of carriers in a distribution system.

FIGS. 3A to 3C show schematically variable move lengths of carriers 116 in the distribution system 110. In systems 110 with areas with rather low traffic intensity, the moves will frequently have the maximum reservation length 164, as can be seen in FIG. 3A. Due to this, the start 166 or stop positions 168 will frequently be the same for many moves and thus lead to a strong usage imbalance and wear of these positions accordingly. As further outlined above, the routing system 134 is configured for considering a variable move length and/or a variable reservation length. For example, the routing system 134 may be configured for using variable move lengths 170 for one or more of: a selection of moves, a certain number of carriers 116, a certain time period, defined areas of the transport plane 112.

In the example shown in FIG. 3B, the move lengths 170 for each step may be varied. If frequently the maximum move lengths can be carried out due to low traffic density, start 166 and stop 168 will take place frequently on the same positions 144. The routing system 134 may be configured for varying the move lengths 170 for each move of a carrier along a route. By varying the move lengths 170 for each step, the positions 114 can be used in a better-balanced way.

In another example, shown in FIG. 3C, the routing system 134 may be configured for varying only the length 170 of a first move 172 of the carriers 116, specifically varying the length 170 of a first move of the carriers 116 such that the carriers 116 stop and/or start on different logical positions 114. Already by varying only the move length 170 of the first move 172, a better balancing can be obtained, as can be seen when comparing FIG. 3C with FIG. 3A.

As outlined above, the control system 132 may be configured for measuring the number of carriers 116 which have been using a logical position 114, for example by the increment counter. The routing system 134 may be configured for comparing the measured number of carriers 116 of neighboring logical positions 114 with a defined threshold and to adapt the move length 170 depending on the comparison. The threshold may be defined and embodied as specified with respect to switching above. Alternatively or additionally, the routing system 134 may be configured for using the measured number as weight factor for optimizing the move length 170. The routing system 134 may be configured to prioritize using logical positions 114 with low weight.

The routing system 134 may be configured for allocating a cost-function to each of the logical positions 114. The cost-function may be increased depending on the measured number of carriers 116 having used the logical position 114. The routing system 134 may be configured to prioritize logical positions 114 with low cost-functions.

As shown in FIG. 3C, the routing system 134 may be configured for using a variable reservation length for all or a selection, e.g., defined or randomly, of moves in a defined area of the transport plane 112. The routing system 134 may be configured for reducing a maximum reservation length 164 for all or a selection of moves in a defined area of the transport plane 112. Alternatively, the routing system may be configured for increasing a minimum reservation length for all or a selection of moves in a defined area of the transport plane 112. The reduction of the maximum reservation length 164 and/or the increase of the minimum reservation length may be used for one or more of each carrier 116 or randomly for carriers 116. The reduction of the maximum reservation length 164 and/or the increase of the minimum reservation length may be performed for a certain time period.

For example, in order to consider balancing of surface usage of the transport plane 112, the plans for moves may be corrected in, e.g., defined areas. The correction may be performed for a certain time period. Instead of making moves with maximum reservation length 164, the reservation length may be reduced for all or just a few moves in a defined area. This reduction can be for each carrier 116 or randomly for carriers 116. The reduction of the reservation length can be done randomly. For example, only the maximum move length of the first step is varied. This will have a similar effect, as it may affect the start-stop positions 166, 168 of the following moves as well in lower-traffic situations. The first move 172 can also be carried out as a first target, reached by only 1 move. The end position 168 of the first move 172 can be varied randomly or in a determined way such that the number of first steps from a certain start position 166 with length n per time period is equal for $n=1, \ldots, n_{max}$, with $n_{max}$ the maximum reservation length 164.

FIGS. 4A to 4D show flow charts of exemplary embodiments of a method for distributing carriers 116 using the distribution system 110. The distribution system 110 may, as an example, be embodied as exemplarily shown in FIG. 1. However, other embodiments of the distribution system 110 are also feasible.

The method steps may be performed in the given order or may be performed in a different order. Further, one or more additional method steps may be present which are not listed. Further, one, more than one or even all of the method steps may be performed repeatedly. Further, one or more of the method steps may be performed simultaneously or in a timely-overlapping fashion.

The method comprises moving the carriers 116 on the transport plane 112 of the distribution system 110 between logical positions 114 by using the drive system 120 (denoted by reference number 174). The method comprises controlling the carriers 116 to move on a planned route from the start position 146 to the final destination position 148 on the transport plane 112 via logical positions 114 by using the control system 132 (denoted by reference number 176). Specifically, the steps of moving 174 and controlling 176 the carriers 116 may comprise sending the planned route to the executing unit 138. The method may further comprise receiving status updates of carrier positions from the control system 132 (denoted by reference number 178) and checking for new assignments of carriers 116 to move to the final destination positions 148 (denoted by reference number 180).

The method comprises calculating the planned route for at least two carriers 116 on the transport plane 112 (denoted by reference number 182) by modeling the transport plane 112 with graphs of nodes 136 by using the routing system 134. The calculating comprises considering balancing of surface usage of the transport plane 112. The calculating comprises considering temporal blocking of logical positions 114 and/or considering a variable move length 170 and/or considering a variable reservation length (denoted by reference number 184).

Figure 4:
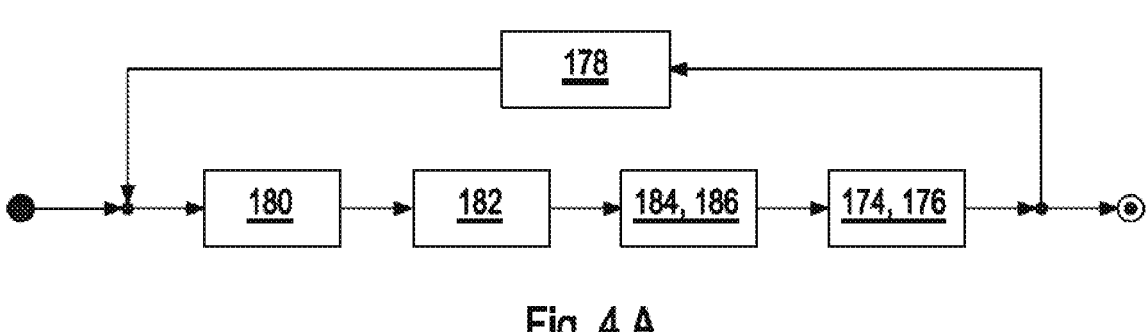
FIGS. 4A to 4D show flow charts of embodiments of a method for distributing carriers using a distribution system.
Figure 4:
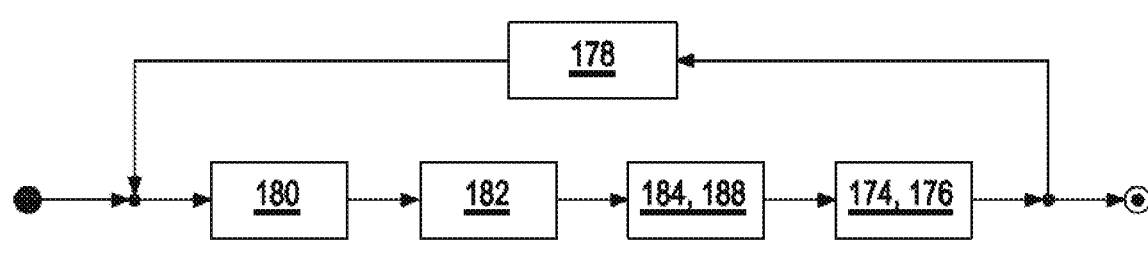
Figure 4:
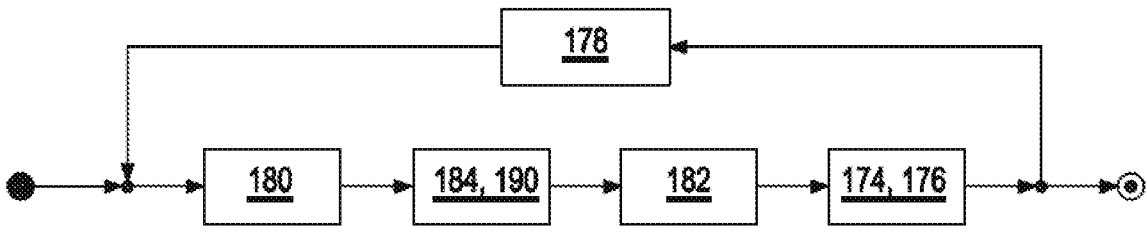
Figure 4:
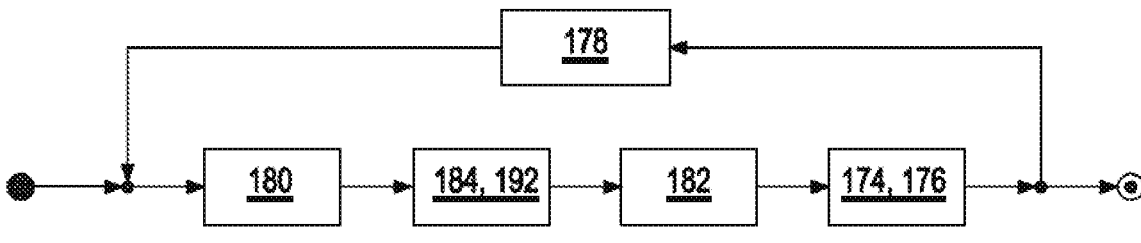

FIGS. 4A to 4D show different flow diagrams for adjusting the move lengths. FIGS. 4A and 4B show the workflow for an implementation where a normal routing algorithm may be used and an adjustment of the move lengths may be carried out (denoted by reference number 186 in FIG. 4A) or only an adjustment of the length of the first move may be carried out (denoted by reference number 188 in FIG. 4B). Adjusting the move lengths after routing may be less efficient for the routing system 134, as typically the routing system 134 also plans the subsequent moves, which, after the adjustment of the move lengths will not be valid anymore. In FIGS. 4C and 4D, the adjustments of the move lengths may be taken into account by the routing system 134 and may therefore result in a more efficient and effective routing. Specifically, the method may comprise considering a variable reservation length (denoted by reference number 190 in FIG. 4C) or considering a variable reservation length for first moves (denoted by reference number 192 in FIG. 4D). Further, for the blocked areas method, the routing system 134 may be independent of the wear-reduction blocking algorithm. For the variation of move length, the wear-reduction part of the algorithm may be integrated into the routing system 134.

LIST OF REFERENCE NUMBERS

110 distribution system
112 transport plane
114 logical positions
116 carriers
118 objects
120 drive system
122 laboratory automation system
124 laboratory station
126 sample container
128 identification and registration system
130 camera system
132 control system
134 routing system
136 nodes
138 executing unit
140 pattern of blocked logical positions
142 first pattern of blocked logical positions
144 second pattern of blocked logical positions
146 start position
148 final destination position
150 unrestricted routes
152 first routes
154 second routes
156 logical sub-area
158 field
160 low traffic pattern
162 high traffic pattern
163 path
164 maximum reservation length
166 start position
168 stop position
170 variable move length
172 first move
174 moving the carriers
176 controlling the carriers
178 receiving status updates
180 checking for new assignments
182 calculating the planned route
184 considering temporal blocking of logical positions and/or a variable move length and/or a variable reservation length

186 adjustment of the move lengths
188 adjustment of the length of the first move
190 considering a variable reservation length
192 considering a variable reservation length for first moves

What is claimed is:

1. A distribution system comprising:
a transport plane comprising logical positions;
carriers for transporting objects;
a drive system to move the carriers on the transport plane between logical positions, the movements of the carriers relative to the logical positions of the transport plane generating surface wear of the logical positions as a result of friction between the carriers and the transport plane;
the movements of the carriers comprising starting, moving over, or stopping of carriers relative to the logical positions; and
a control system controlling the carriers to move on planned routes from start logical positions to final destination logical positions on the transport plane via intermediate logical positions,
wherein the control system comprises a routing system calculating the planned routes for each of at least two carriers on the transport plane by modeling the transport plane with graphs of nodes,
wherein the routing system calculates each planned route based on a balancing of the surface wear of the transport plane using at least one of temporal blocking of logical positions, variable move length, and variable reservation length, and
wherein the balancing of the surface wear of a logical position takes into account the amount of surface wear caused each time a carrier starts to move from the logical position ("start wear"), each time a carrier moves over the logical position ("move wear"), and each time a carrier stops on the logical position of the transport plane ("stop wear"), the "total wear" of a logical position comprising the total of the start wear, the move wear and the stop wear for that logical position.

2. The distribution system according to claim 1, wherein the calculation of the routes comprises determining shortest paths for the carriers across the transport plane from the start position to the final destination position.

3. The distribution system according to claim 1, wherein the routing system is configured for defining at least two patterns of blocked logical positions, wherein one of the patterns forces the routing system calculating first routes for the carriers and another one of the patterns forces the routing system calculating second routes for the carriers different from the first routes.

4. The distribution system according to claim 3, wherein the routing system is configured for switching from one pattern to another pattern after a predefined time and/or based on the number of carriers moved over a certain area of the transport plane.

5. The distribution system according to claim 4, wherein the control system is configured for measuring the number of carriers which have been using the certain area of the transport plane since the last switch, wherein the routing system is configured for switching to another pattern if a defined threshold has been reached.

6. The distribution system according to claim 3, wherein the patterns comprise at least one low traffic pattern having a first number of blocked logical positions and at least one high traffic pattern with a second number of blocked logical positions, wherein the second number is reduced in comparison to the first number.

7. The distribution system according to claim 1, wherein the blocked logical positions are arranged to block the number of different options for carriers to move.

8. The distribution system according to claim 1, wherein the routing system is configured for using variable move lengths for one or more of: a selection of moves, a certain number of carriers, a certain time period, and defined areas of the transport plane.

9. The distribution system according to claim 8, wherein the routing system is configured for varying only the length of a first move of the carriers.

10. The distribution system according to claim 8, wherein the routing system is configured for varying the move lengths for each move of a carrier along a route.

11. The distribution system according to claim 9, wherein the control system is configured for measuring the number of carriers which have been using a logical position, wherein the routing system is configured for comparing the measured number of carriers of neighboring logical positions with a defined threshold and to adapt the move length depending on the comparison.

12. The distribution system according to claim 9, wherein the control system is configured for measuring the number of carriers which have been using a logical position, wherein the routing system is configured for using the measured number as weight factor for optimizing the move length, wherein the routing system is configured to prioritize using logical positions with low weight.

13. The distribution system according to claim 1, wherein the routing system is configured for using a variable reservation length for all or a selection of moves in a defined area of the transport plane, wherein the routing system is configured for reducing a maximum reservation length for all or a selection of moves in a defined area of the transport plane and/or for increasing a minimum reservation length for all or a selection of moves in a defined area of the transport plane.

14. The distribution system according to claim 1, wherein the control system comprises at least one executing unit configured for executing the planned routes for transporting the carriers from their respective start position to their respective final position.

15. A method for distributing carriers using a distribution system according to claim 1, wherein the method comprises moving the carriers on the transport plane of the distribution system between logical positions by using the drive system, wherein the method comprises controlling the carriers to move on a planned route from the start position to the final destination position on the transport plane via intermediate logical positions by using the control system, wherein the method comprises calculating the planned route for at least two carriers on the transport plane by modeling the transport plane with graphs of nodes by using the routing system, wherein the calculating comprises balancing of surface wear of the transport plane, and wherein the calculating comprises using temporal blocking of logical positions and/or a variable move length and/or a variable reservation length.

16. The distribution system of claim 1 comprising the routing system balancing surface wear using temporal blocking of logical positions, variable move length, and variable reservation length.

17. The distribution system of claim 15 in which a planned route utilizes a series of logical positions, and the balancing takes into account the surface wear for each of the series of logical positions.

18. The distribution system of claim 1, wherein the method further comprises determining for each logical position the amount of surface wear caused by carriers starting, moving over or stopping at the logical position during a period of time.

19. The distribution system of claim 18, wherein the balancing of surface wear of a logical position takes into account the number of starts, move overs and stops of carriers at each logical position.

20. The distribution system of claim 19, wherein the number of starts, move overs and stops are determined for a specified time period.

21. The distribution system of claim 20 wherein the balancing of surface wear comprises determining the total wear of each logical position.

22. The distribution system of claim 21, wherein the determining of the total wear comprises determining the start wear, the move over wear and the stop wear of each logical position.

23. The distribution system of claim 22, wherein determining the start wear, the move over wear and the stop wear of each logical position is based on the number of starts, move overs and stops of carriers at the logical position.

24. The distribution system of claim 23, wherein the start wear, the move over wear and the stop wear are determined for a specified time period.

25. The distribution system of claim 23, wherein the start wear, the move over wear and the stop wear are determined in absolute terms.

26. The distribution system of claim 19, wherein the balancing of surface wear comprises the routing system calculating planned routes to equalize the total surface wear of the logical positions.

27. The distribution system of claim 1, wherein the distribution system comprises at least a first logical position and at least a second logical position.

28. The distribution system of claim 27, wherein the balancing of surface wear takes into account the total wear of each of the at least a first logical position and the at least a second logical position.

29. The distribution system of claim 28, wherein the balancing of surface wear comprises comparing the total wear of the at least a first logical position with the total wear of the at least a second logical position.

30. The distribution system of claim 29, wherein the balancing of surface wear comprises the routing system calculating planned routes to equalize the total surface wear of the at least a first logical position and the total surface wear of the at least a second logical position.

31. The method of claim 15, wherein the determining comprises counting the number of starts, move overs and stops for each logical position.

32. The method of claim 31, wherein determining the total wear of each logical position comprises totaling the start wear, the move over wear, and the stop wear of each logical position.

33. The method of claim 32, wherein the balancing of surface wear comprises the routing system calculating planned routes to equalize the total surface wear of the logical positions.

* * * * *